United States Patent
Hsu

(10) Patent No.: US 6,523,800 B2
(45) Date of Patent: Feb. 25, 2003

(54) ARTICLE-POSITIONING BOARD

(75) Inventor: Mu-Chaun Hsu, Taipei (TW)

(73) Assignee: L&F Plastics Co., Ltd., Taipei (TW)

( * ) Notice: Subject to any disclaimer, the term of this patent is extended or adjusted under 35 U.S.C. 154(b) by 0 days.

(21) Appl. No.: 10/105,768

(22) Filed: Mar. 25, 2002

(65) Prior Publication Data

US 2002/0171022 A1 Nov. 21, 2002

(30) Foreign Application Priority Data

May 16, 2001 (TW) ...................................... 90208200 U

(51) Int. Cl.$^7$ ................................................. B62H 5/00
(52) U.S. Cl. .................. 248/499; 248/224.61; 248/500; 248/505; 248/510; 410/107; 410/111; 206/478
(58) Field of Search ................................. 248/499–510, 248/551, 224.61; 410/111, 106, 107, 110, 114, 112; 206/478; 24/265 CD

(56) References Cited

U.S. PATENT DOCUMENTS

| | | | | |
|---|---|---|---|---|
| 3,412,693 A | * | 11/1968 | Lewis | 410/111 |
| 3,765,637 A | * | 10/1973 | Watts | 410/116 |
| 3,877,671 A | * | 4/1975 | Underwood et al. | 248/346.03 |
| 3,955,847 A | * | 5/1976 | Schiowitz | 296/65.04 |
| 4,400,856 A | * | 8/1983 | Tseng | 24/590.1 |
| 4,457,650 A | * | 7/1984 | Tseng | 410/111 |
| 4,645,392 A | * | 2/1987 | Takaguchi | 410/80 |
| 4,907,921 A | * | 3/1990 | Akright | 410/111 |
| 5,180,263 A | * | 1/1993 | Flowers, Jr. | 410/106 |
| 6,065,917 A | * | 5/2000 | Shambeau et al. | 410/107 |
| 6,138,975 A | * | 10/2000 | McDaid | 248/499 |

* cited by examiner

Primary Examiner—Leslie A. Braun
Assistant Examiner—Tan Le
(74) Attorney, Agent, or Firm—Alan Kamrath; Rider, Bennett, Egan & Arundel, LLP

(57) ABSTRACT

An article-positioning board includes a board body provided on top surface with a plurality of through holes respectively having a comparatively large diameter at the bottom side and a relatively small diameter on the topside for receiving a same-shaped insert member. Each insert member has a recess formed in an upper portion, and each recess has a holding space extending outward oppositely in one inner side for receiving the lateral rods of the clasp. Thus, when ropes (elastic or not) pass through and are fastened on the clasps preset in direction, non-plane articles of different shapes and sizes can duly be positioned firmly and quickly, no matter where they are placed on the board.

2 Claims, 4 Drawing Sheets

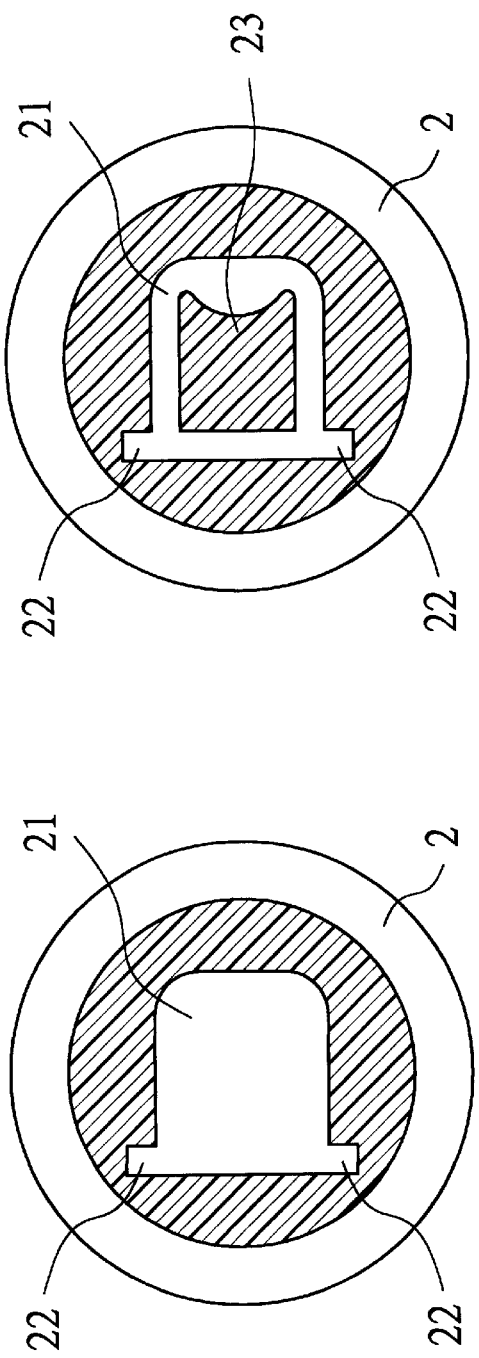
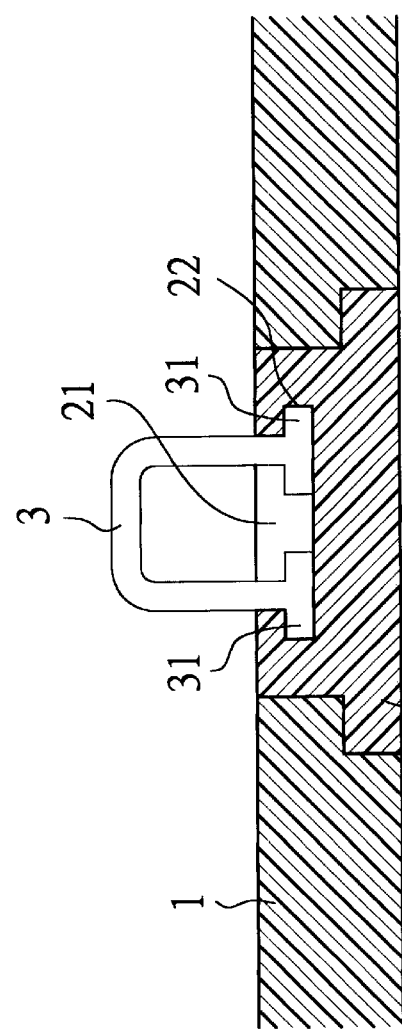

ARTICLE-POSITIONING BOARD

BACKGROUND OF THE INVENTION

This invention relates to a combined an article-positioning board, particularly to one able to let non-plane and uneasily-positioned articles firmly supported in place on it by easy and quick clasping, fastening, binding, etc. when the articles are on the way of transporting or placed at a working site, enabling easy-rolling articles of different shapes to be positioned smoothly and stably under any circumstances.

Generally, when non-plane articles are stacked up in an indoor space, they are usually blocked and limited by some comparatively heavy things provided smoothly around their outer circumference so as to prevent the stacked articles from rolling and scattering about by accidental touching or knocking. On the other hand, when non-plane articles are loaded and transported by a motorcycle, they are tightly tied by means of a rope fastened to certain stationary things (such as its rear seat). But, it is hard to find a place for such non-plane articles to be firmly positioned by tying with ropes in the inner space of a common car. Therefore, when non-plane articles are loaded in a car to be transported, they have to be closely stacked up together and then kept in place by some heavy and stable things blocking their outer circumference to prevent them from rolling and scattering around due to abrupt braking of a car.

The way of positioning non-plane articles in an indoor space or in a car described above can completely be improved by this invention, which can make non-plane articles of different shapes and sizes fixed in place on it, whether such non-plane articles are stacked indoors or placed in a car for transporting.

SUMMARY OF THE INVENTION

This invention is devised to offer an article-positioning board. The board is preset in shape and bored on the top surface with a plurality of through holes respectively with a comparatively large diameter at the bottom side and a relatively small diameter on the topside for receiving same-shaped insert members. The insert members respectively have a shaped recess formed in an upper portion, and each recess has a holding space extending outward oppositely at one inner side for receiving two lateral rods of a clasp. Thus, when the non-plane articles are placed in a common space or in an automobile for transporting, they can duly be supported in place stably by ropes (elastic or not), which pass through and are fastened around the clasps preset in direction.

BRIEF DESCRIPTION OF DRAWINGS

This invention will be better understood by referring to the accompanying drawings, wherein:

FIG. 2 is a cross-sectional view of the article-positioning board in the present invention:

FIG. 3 is an upper view of an insert member with its recess and holding space in the present invention:

FIG. 4 is an upper view of another insert member with its recess and holding space and a projection in the present invention:

DETAILED DESCRIPTION OF THE PREFERRED EMBODIMENT

Figure 1:
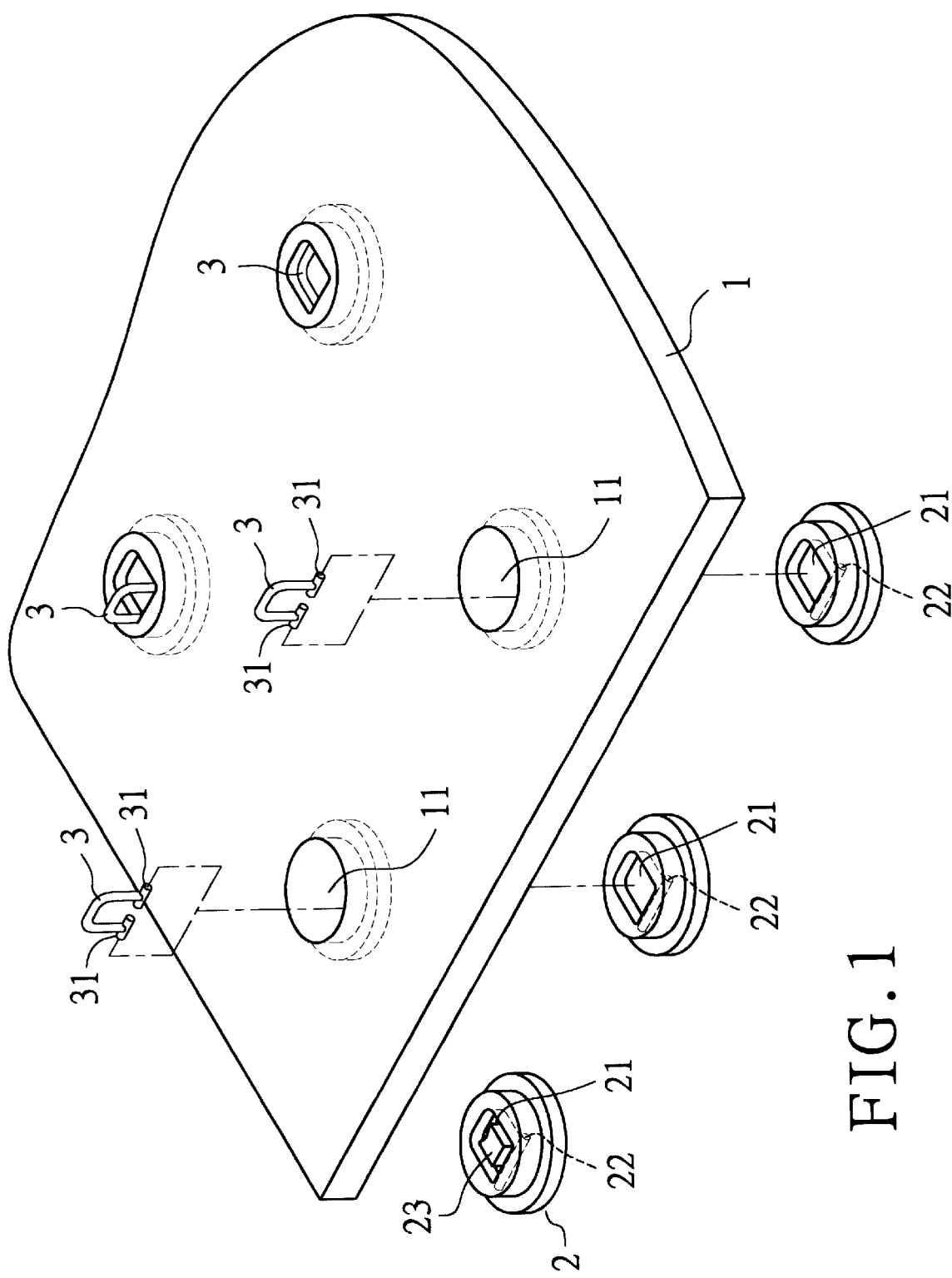
FIG. 1 is an exploded perspective view of an article-positioning board in the present invention.
Figure 5:
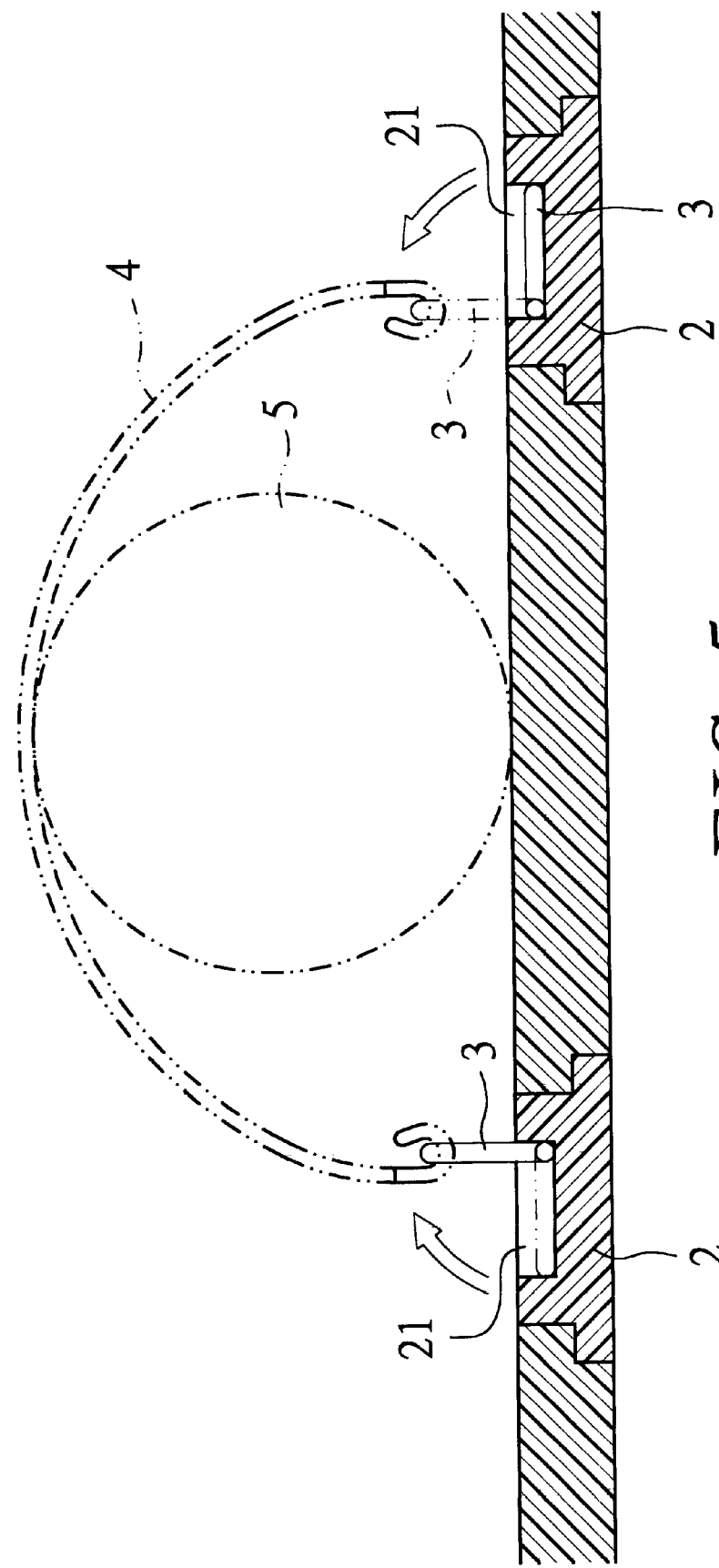
FIG. 5 is a cross-sectional view of fastening a non-plane article on the article-positioning board by a rope in the present invention.
Figure 6:
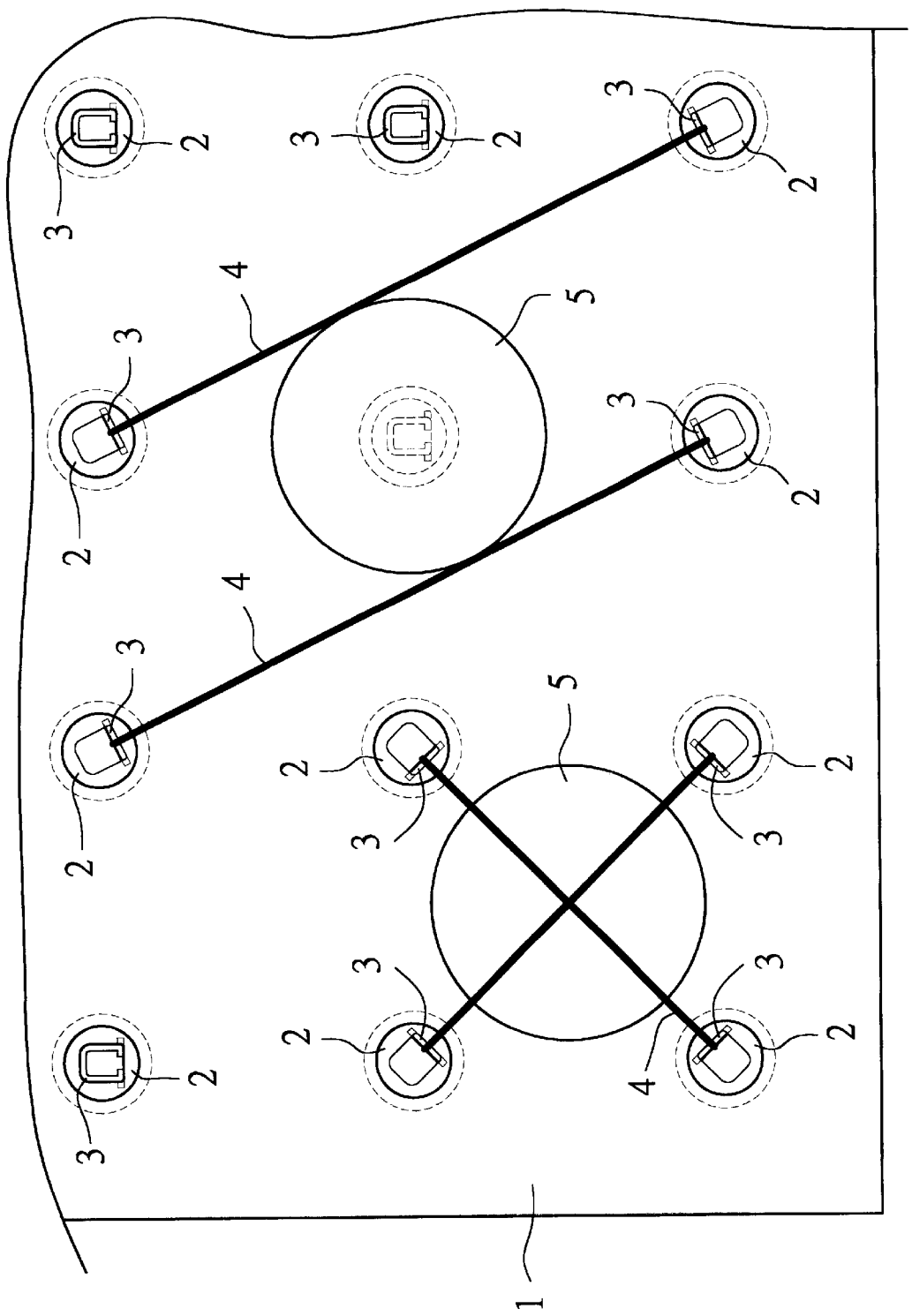
FIG. 6 is an upper view of various ways in fastening non-plane articles of different shapes on the article-positioning board by means of ropes in the present invention.

A preferred embodiment of an article-positioning board in the present invention, as shown in FIGS. 1 and 2, includes a board body 1, a plurality of insert members 2, a number of clasps 3 and several ropes 4 as main components combined together.

The shape and the size of the board body 1 are decided according to what is needed in practical use. The board body 1 is bored on the top surface with a plurality of through holes 11 respectively with a comparatively large diameter at the bottom side and a relatively small diameter on the top side for respectively receiving the same-shaped insert members 2, as shown in FIG. 2.

The insert members 2 respectively have its top side formed with a recess 21, and the recess 21 has one inner side extending outward oppositely to form a holding space 22, as shown in FIG. 3, for receiving two lateral rods 31 protruding outward oppositely from two bottom ends of an inverted U-shaped clasp 3. The clasp 3 is pressed inward in the recess 21 to force the lateral rods 31 inserted into the recess 21 and held firmly in the holding space 22 after the clasp 3 recovers its resilience.

Besides, the intermediate portion of the recess 21 in the upper side of the insert member 2 for receiving the clasps 3 can be formed with a projection 23, as shown in FIG. 4, to allow the clasp 3 held flat and horizontally between the recess 21 and the projection 23 in case of no ropes (elastic or not) used.

The insert members 2 and the clasps 3 of the article-positioning board in the invention can be used for positioning non-plane articles of different shapes and sizes in cooperation with ropes (elastic or not) which pass through and are fastened around the clasps 3 preset in direction of the board body 1 to firmly support the non-plane articles in place, no matter where such non-plane articles may be placed, thus, requiring no heavy things for blocking and securing them.

While the preferred embodiments of the invention have been described above, it will be recognized and understood that various modifications may be made therein and the appended claims are intended to cover all such modifications that may fall within the spirit and scope of the invention.

I claim:

1. An article-positioning board comprising a board body preset in size and shape and several ropes (elastic or not) preset in length for fixing non-plane articles in place on said board body;

characterized by said board body bored on a top surface with a plurality of through holes respectively with a comparatively large diameter at a bottom side and a relatively small diameter on the top side, said through holes respectively receiving a same-shaped insert member, each said insert member having its top side formed with a recess, each said recess having a holding space extending outward oppositely along one inner side, said holding space receiving two lateral rods protruding out oppositely from two bottom ends of an inverted U-shaped clasp, said clasp with said lateral rods pressed and inserted into said recess, said lateral rods held firmly in said holding space after said clasp recovers its resilience; and, said article-positioning board used for positioning non-plane articles of different shapes and sizes on it in cooperation with said ropes (elastic or not), said ropes passing through and fastened on said clasps preset in direction to stabilize non-plane articles on said board with firmness and quickness.

2. The article-positioning board as claimed in claim 1, wherein the intermediate portion of said recess in the upper side of said insert member for receiving said clasp is formed with a projection to allow said clasp held flat and horizontally between said recess and said projection in case of no ropes (elastic or not) used.

* * * * *